United States Patent

Yoneyama

[15] 3,688,283

[45] Aug. 29, 1972

[54] INSPECTION APPARATUS FOR MAGNETIC WIRE TYPE MEMORY ELEMENT

[72] Inventor: Toshikazu Yoneyama, Tokyo, Japan

[73] Assignee: Toko Kabushiki Kaisha, Tokyo-to, Japan

[22] Filed: Feb. 25, 1970

[21] Appl. No.: 14,087

[52] U.S. Cl..340/174 TC, 324/34 MC, 340/174 PW, 340/174 QB, 340/174 TF

[51] Int. Cl.....G11c 11/04, G11c 11/14, G01r 33/00

[58] Field of Search...340/174 PW, 174 TF, 174 TC, 340/174 QB; 324/34 MC

[56] References Cited

UNITED STATES PATENTS 3,497,797 2/1970 Meyers et al.........324/34 MC

*Primary Examiner*—James W. Moffitt

*Attorney*—Robert E. Burns and Emmanuel J. Lobato

[57] ABSTRACT

Apparatus for inspecting memory points of a magnetic wire type memory element, in which combination of a mechanical switch device and a semiconductor switch device is utilized as a memory point inspecting switch device, whereby a high speed inspection and a simple construction of the apparatus are made possible.

Furthermore, a particular modification of the invention comprises an additional switch connected to close an electric circuit necessary for inspecting succeeding memory points, whereby a continuous inspection of successive memory points is made possible.

5 Claims, 4 Drawing Figures

INSPECTION APPARATUS FOR MAGNETIC WIRE TYPE MEMORY ELEMENT

BACKGROUND OF THE INVENTION

The present invention relates to improvements of a switch device provided in an inspection apparatus for inspecting memory points of a magnetic wire type memory element.

In general, a magnetic wire type memory array relates to an element or array, in which insulated conductor wires (word wires) are crossed with magnetic wires (information wires) each of which is composed of a core conductor and a thin magnetic film coated therearound, and the cross points between said magnetic wires and insulated wires are used as the memory points. Such a memory array or element mentioned above can be effectively and widely used for a memory apparatus in any high speed electronic computer, because time required for writing in and reading out any information is very short.

In the course of manufacturing the magnetic type memory element (hereinafter, referred to as "memory element"), inspection of memory points is naturally required. The principle for this inspection resides in discriminations as to whether or not memory content of any memory point (address) is broken by imparting various disturbances to said address.

However, the conventional inspection apparatus mentioned above utilizes a mechanical switch device as will be described in detail hereinafter, so that inspection speed required for switching the addresses to be inspected is relatively low, because the switching time of the conventional mechanical switch corresponds normally to several milliseconds, thus requiring a long time for the inspection of a memory element of relatively large capacity.

SUMMARY OF THE INVENTION

Therefore, it is an essential object of the invention to provide an improved inspection apparatus adapted to magnetic wire type memory element, said apparatus having no disadvantages of the conventional apparatus.

It is another object of the invention to provide an improved inspection apparatus as mentioned above, said apparatus being adapted to carry out continuous inspection of successive memory points of the memory element.

The foregoing and other objects of the invention have been attained, according to the invention, by the apparatus comprising a mechanical switch device and a semiconductor switch device which are combined so as to carry out switching of memory points to be inspected. The mechanical switch device consists of a plurality of mechanical switches divided into groups, terminals at one side of the mechanical switches connected to a word wire or an information wire and other terminals of the mechanical switches being connected to bus bar per group, and one of said semiconductor switch device for selecting a memory point to be inspected being connected between power source and each bus bar.

The characteristic features and function of the present invention will become apparent by the following description taken in connection with the accompanying drawings, in which the same or equivalent members are designated by the same numerals and characters.

DETAILED DESCRIPTION OF THE INVENTION

An inspection pattern in the case of the inspection of memory points of the conventional memory element mentioned already will be first described in detail, as follows, in connection with FIG. 1, for the sake of clarifying the function and advantages of the invention 1. Previous record disturbance: (**1*a*, FIG. 1**)

To write in, for the necessary number of times, an information "0" which is reverse to the information to be inspected, for example, "1" in the address n to be inspected.

2. Adjacent previous record disturbance: (**2*a*, FIG. 1**)

To write in, for the necessary number of times, an information "0" which is reverse to the information to be inspected, for example, "1" in one side address ($n$–1) of both side addresses adjacent to an address n to be inspected. Generally in order to inspect a magnetic line memory element, it is necessary to apply about 1,000 – 1,000,000 times of disturbances thereto. Accordingly, necessary number of times used here means this necessary disturbance number of times.

3. Adjacent previous second disturbance: (**3*a*, FIG. 1**)

To apply a disturbance to an adjacent address ($n$+1) in the same manner mentioned above.

4. Writing-in: (**4*a*, FIG. 1**)

To write in a correct information "1" only once in the address n to be inspected.

5. Reading-out disturbance: (**5*a*, FIG. 1**)

To read out, for the necessary number of times, the information written in the address n to be inspected. In this case, for the purpose of confirming the affect due to an information current, an information current is made to flow at the time shifted slightly from the flowing time of the word current.

6. Adjacent disturbance (I): (**6*a*, FIG. 1**)

To write in a reverse information "0" in the address ($n$–1).

7. Adjacent disturbance (II): (**7*a*, FIG. 1**)

In this case since there are two word lines which are adjacent to an address to be inspected and it is necessary to apply a disturbance to both the word lines, a left adjacent word line (I) and a right adjacent word line (II) are distinguished respectively.

To write in a reverse information "0" in the address ($n$+1).

8. Reading-out: (**8*a*, FIG. 1**)

To read out the information memorized in the address $n$ and to inspect whether or not the output satisfies the required value.

9 – 16: (**9*a*, – 16*a*, FIG. 1**)

The inspections carried according to the above items (1) to (8) relate to an information (in the example, "1" ), but the memory element can produce reading-out outputs of both polarities with respect to "1" and "0", so that the reverse information "0" can be inspected in accordance with sequence of (9), (10), (11), (12), (13), (14), (15) and (16), and then inspection of the address $(n+1)$ is repeated. Previous record disturbances, reading-out disturbance and adjacent disturbance etc. are respectively the kinds of disturbances necessary for inspecting a wire memory.

Figure 1:
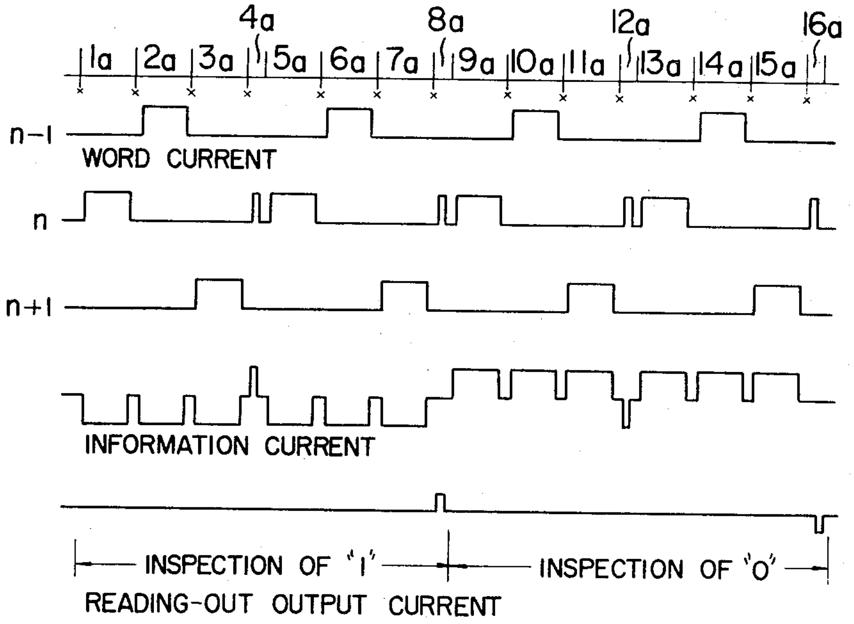
FIG. 1 is a wave diagram illustrating an inspection pattern of a magnetic wire type memory element.

In this case, in order to inspect one of the memory points by the inspection pattern (FIG. 1) described above, it is necessary to switch word wires for thirteen times at the time designated X in FIG. 1.

(1a), (1*a*) – (2*a*), (2*a*) – (3*a*), (3*a*) – 4(*a*), (5*a*) – (6*a*),
(6*a*) – (7*a*), (7*a*) – (8*a*), (9*a*) – (10*a*), (10*a*) – (11*a*),
(11*a*) – (12*a*), (13*a*) – (14*a*), (14*a*) – (15*a*), (15*a*) – (16*a*)

In FIG. 1, mark $x$ indicates the time for switching word wires.

Figure 2:
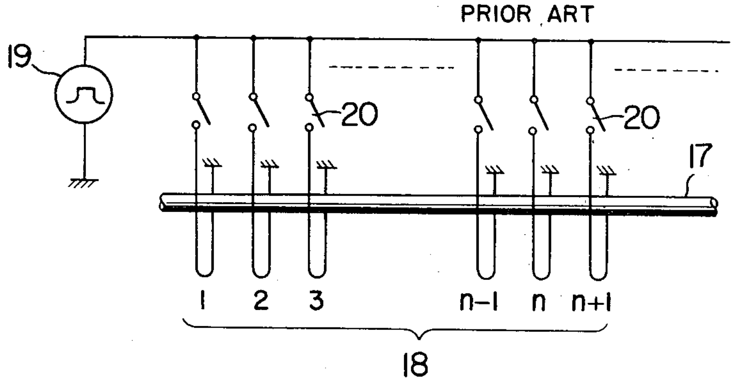
FIG. 2 PRIOR ART
FIG. 2 is a schematic circuit diagram illustrating a principle of the conventional inspecting apparatus.

FIG. 2 illustrates the principle of the conventional inspection apparatus, in which the numerals 17, 18, 19, and 20 indicate, respectively, an information wire, word wires $(1, 2 \ldots n+1)$, a pulse source, and a plurality of mechanical switches for example reed relays for a switching address to be inspected.

However, in the conventional apparatus utilizing mechanical switches as described above, the speed of switching the address to be inspected is relatively slow and a long period of time is required for the inspection of a large capacity type memory element.

In order to shorten the switching time for the address to be inspected, it may be easily thought to use a semiconductor switch such as an SCR or transistor. However, the semiconductor switch has an unfavorable characteristic in connection with its switching resistance, junction capacitance and the like, and non-uniformity of the semiconductor switches in particular will become a difficult problem where a large number of switches are utilized.

The disadvantages mentioned above have been effectively eliminated in this invention by the system in which mechanical switches are combined with semiconductor switches so as to utilize their excellent points, thereby to carry out switching of word wires with low non-uniformity.

Figure 3:
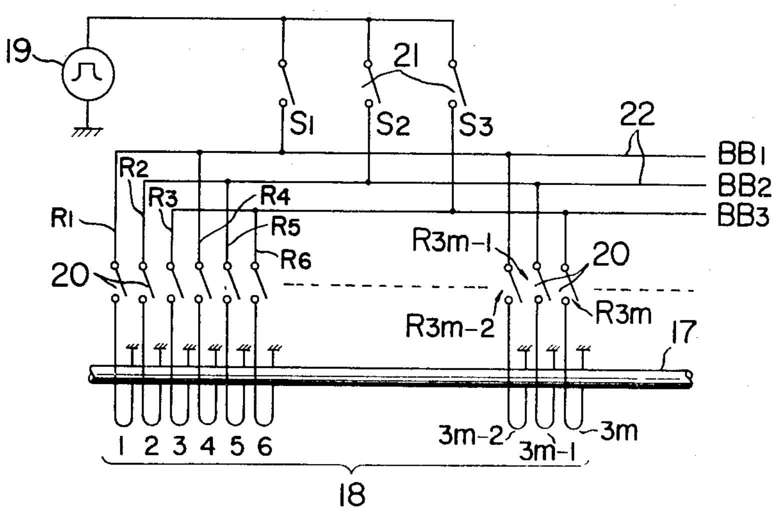
FIG. 3 is a schematic circuit diagram of an example according to the invention.

An example of the present invention is illustrated in FIG. 3. The apparatus shown in FIG. 3 comprises an information wire 17, word wires 18 $(1, 2, \ldots 3m)$, a pulse source 19, mechanical switch device 20, such as a Reed relay consisting or a plurality of switches $R_1$ to $R_6 \ldots R_{3}m$, semiconductor switch device 21 consisting of a plurality of semiconductor switches $S_1$, $S_2$, $S_3$ each consisting of a transistor, and bus bar group 22 consisting of $BB_1$, $BB_2$ and $BB_3$.

The mechanical switch device 20 is divided in groups each group of which is connected to a respective one of the bus bar group 22. Each mechanical switch in one group is always maintained in its closed state and one group is selected by means of the semiconductor switch device 21, thereby to select the word wire corresponding to the address to be inspected.

That is, the mechanical switch device 20 is grouped into three groups, that is, $(R_1, R_4, R_8, \ldots R_{3m-2})$, $(R_2, R_5, R_8, \ldots R_{3m-1})$, and $(R_3, R_6, \ldots R_{3m})$. Terminals at one side of the mechanical switches belonging to the respective group are connected to the bus bars $BB_1$, $BB_2$, and $BB_3$ of the bus bar group 22 and one of the bus bars is selected by means of the semiconductor switch device 21.

For example, when inspection of an address 2 is to be carried out in accordance with the above-mentioned inspection sequence, it is only necessary that switches $R_1$, $R_2$ and $R_3$ of the mechanical switches are maintained in their closed states and the semiconductor switch device 21 is opened and closed in accordance with the sequence of the inspection. That is firstly, 1. In the case of a previous applied disturbance; the switch $S_2$ is closed, thereby to make a current flow into the word wire corresponding to an address 2 through a closed circuit including the pulse source - $S_2 - {}_{R2}$. The rest is as follows.
2. Adjacent previous second disturbance (I) by closing the switch $S_1$ (2*a*).
3. Adjacent previous record disturbance (II) by closing the switch $S_3$ (3*a*).
4. Writing-in by closing the switch $S_2$ (4*a*).
5. Reading-out disturbance (I) by closing the switch $S_2$ (5*a*).
6. Adjacent disturbance (I) by closing the switch $S_1$ (6*a*).
7. Adjacent disturbance (II) by closing the switch $S_3$ (7*a*).
8. Reading-out by closing the switch $S_2$ (8*a*).

In accordance with the above-mentioned sequence, one information, for example, "1" is inspected. Next, the same procedures as mentioned above are repeated in accordance with pattern sequences (9) – (16), whereby inspection relating to the reverse information "0" is carried out (9a-16a). Upon completion of the inspection relating to the address 2, the switches $R_2$, $R_3$ and $R_4$ are closed, whereby inspection of the address 3 can be attained. The rest of inspection can be similarly attained in connection with other addresses.

As mentioned above, according to the apparatus of the invention, as the switch for exchanging the circuit during inspection of one address, only switching of the semiconductor switch device 21 is necessary and its switching time is normally below one microsecond, so that the inspection time can be remarkably shortened and moreover non-uniformity of switching characteristics can be extremely reduced, because switching of only a few of the semiconductor switches is necessary.

However, in the case of the example shown in FIG. 3, it is only necessary to switch the mechanical switch device 20 per switching of the address to be inspected, it cannot be avoided that inspection pause time of about several milliseconds required for switching said mechanical switch device 20 is produced.

Figure 4:
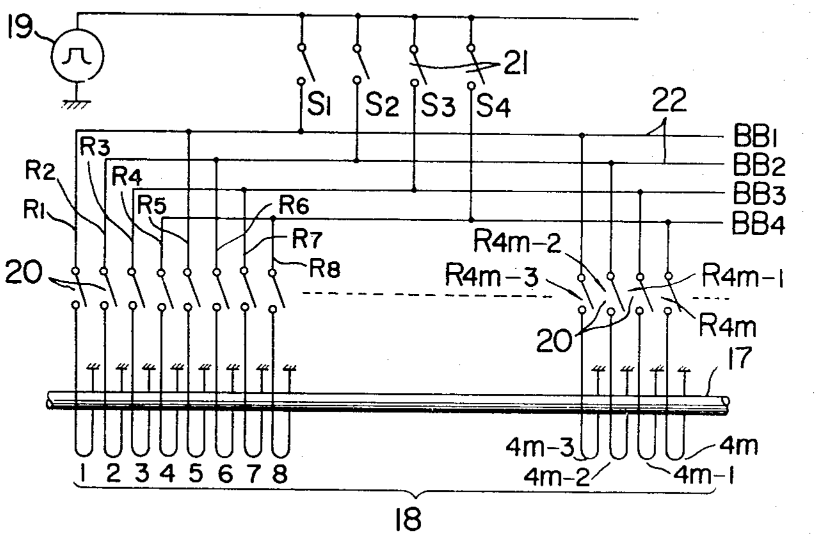
FIG. 4 is another schematic circuit diagram of another example of the invention.

The example illustrated in FIG. 4 shows a principal circuit of the apparatus which can continuously inspect addresses without producing the inspection pause time mentioned above in connection with the example shown in FIG. 3. In general, in the case of inspecting a memory element, it is only necessary to make a current corresponding to the sequence steps mentioned above flow with respect to the address to be inspected and to its adjacent address in the example shown in FIG. 4. The mechanical switch device 20 is divided into four groups, terminals at one end of mechanical switches connected to a common bus bar 22, one of the mechanical switches belonging to each group is maintained in its closed state, and the semiconductor switch device 21 is switched as in the same manner as the example shown in FIG. 3.

In the case of the example shown in FIG. 4, although four switches of the mechanical switch device 20 are always closed, in each sequence step, there is an idle bus bar through which no current flows. Accordingly, if during inspection of an address the word wire of the address to be nextly inspected is connected to the idle bus bar, a continuous inspection can be attained.

That is, if it be assumed that a memory point to be now inspected corresponds to an address 2, the mechanical switches $R_1$, $R_2$, $R_3$ and $R_4$ are firstly closed and then the semiconductor switches $S_1$, $S_2$ and $S_3$ are successively switched. Then, in the case of inspecting the next address 3, it is only necessary to switch the semiconductor switch device 21, because the mechanical switches $R_2$, $R_3$ and $R_4$ are already in closed state. In this inspection course, no current flows through the bus bar $BB_1$ of the bus bar group 22, so that even when during inspection of the address 3, the switch $R_1$ is opened and the switch $R_5$ is closed, no effect occurs and inspection of the address 4 can be started upon completion of the address 3, and so on.

The invention can be, of course, applied for to switch information wire.

As described above, according to the invention, there are various advantages such that inspection time can be remarkably shortened in comparison with the conventional systems, particularly pause time required conventionally for switching the memory points to be inspected is not necessary, apparatus is relatively simple and operation of the apparatus becomes easy, and accordingly a large capacity type memory element can be efficiently inspected.

What is claimed is:

1. Apparatus for inspecting a magnetic wire type memory array comprising, in combination with an information wire and a plurality of word wires coupled to said information wire defining a multiplicity of memory addresses in a memory array, a plurality of groups of mechanical switches, a plurality of busbars, each of said mechanical switches in each group having a terminal connected to a respective word wire and another terminal connected to a respective busbar, the number of mechanical switches connected to each busbar corresponding in number to the number of groups, a plurality of semiconductor switches each connected to a respective busbar for selecting individually the memory addresses to be inspected, a pulse source, means connecting the semiconductors to said pulse source.

2. Apparatus according to claim 1, including a busbar for effecting continuous inspection of elected memory addresses.

3. Apparatus according to claim 1, in which said mechanical switches comprise reed switches.

4. Apparatus according to claim 1, in which said busbars comprise three busbars.

5. Apparatus according to claim 4, in which said busbars comprise four busbars.

* * * * *